United States Patent Office 3,144,435
Patented Aug. 11, 1964

3,144,435
POLYMERS OF N-SUBSTITUTED ISOMALEIMIDES
AND A PROCESS FOR THEIR PREPARATION
Carol K. Sauers, Middlebush, and Robert J. Cotter, New
Brunswick, N.J., assignors to Union Carbide Corporation, a corporation of New York
No Drawing. Filed May 24, 1960, Ser. No. 31,255
25 Claims. (Cl. 260—78)

This invention relates to thermoplastic linear polymers of N-substituted isomaleimides. More particularly, this invention relates to polymers which are formed from N-substituted isomaleimides and organic diamines having at least one hydrogen atom attached to each nitrogen atom.

The linear thermosplastic polymers of the present invention are prepared by polymerizing an organic diamine having at least one hydrogen atom attached to each nitrogen atom with an N-substituted isomaleimide having the general formula:

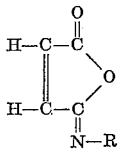

in which R is either a monovalent hydrocarbon radical or a divalent hydrocarbon radical having as a substituent on its terminal carbon atom a radical having the formula:

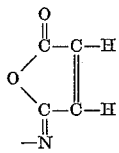

These latter N-substituted isomaleimides are commonly referred to as bis-isomaleimides.

The term "monovalent hydrocarbon radical" as used herein refers to unsubstituted hydrocarbon radicals, as well as to substituted hydrocarbon radicals.

Exemplary of such radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated hydrocarbon radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chloro-cyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxy cyclohexyl, and the like; aralkyl radicals, such as benzyl, 2-phenyl ethyl, 3-phenyl-n-propyl, 1-phenyl-n-butyl, 1-phenyl-n-dodecyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl; p-ethoxyphenyl, p-n-propoxyphenyl, and the like; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl) phenyl, and the like; nitro substituted aryl radicals, such as p-nitrophenyl, 2-nitronaphthyl, and the like; other suitable radicals include 4-hydroxy-1-naphthyl, and the like.

Representative of isomaleimides wherein R in the general formula previously given is a monovalent hydrocarbon radical are the following: N-methyl isomaleimide, N-ethyl isomaleimide, N-n-propyl isomaleimide, N-allyl isomaleimide, n-butyl isomaleimide, N-tertiary butyl isomaleimide, N-n-hexyl isomaleimide, N-(2-ethyl-n-hexyl) isomaleimide, N-n-heptyl isomaleimide, N-n-nonyl isomaleimide, N-n-dodecyl isomaleimide, N-n-docosyl isomaleimide, N-cyclohexyl isomaleimide, N-(2-chloroethyl) isomaleimide, N-(2-bromoethyl) isomaleimide, N-(2-fluoroethyl) isomaleimide, N-(2-iodo-n-propyl) isomaleimide, N-(2-chloro-n-hexyl) isomaleimide, N-methoxymethyl isomaleimide, N-benzyl isomaleimide, N-(2-phenylethyl) isomaleimide, N-(3-phenyl-n-propyl) isomaleimide, N-(4-phenyl-n-butyl) isomaleimide, N-phenyl isomaleimide, N-naphthyl isomaleimide, N-(o-chlorophenyl) isomaleimide, N-(m-bromophenyl) isomaleimide, N-(p-fluorophenyl) isomaleimide, N-(o-iodophenyl) isomaleimide, N-(o-methoxyphenyl) isomaleimide, N-(m-methoxyphenyl) isomaleimide, N-(p-ethoxyphenyl) isomaleimide, N-(p-n-butoxyphenyl) isomaleimide, N-(p-chloro-m-methylphenyl) isomaleimide, N-(o-methylphenyl) isomaleimide, N-(m-methylphenyl) isomaleimide, N-(o-ethylphenyl) isomaleimide, N-(m-ethylphenyl) isomaleimide, N-(p-ethylphenyl) isomaleimide, N-(o-isopropylphenyl) isomaleimide, N-(m-isopropylphenyl) isomaleimide, N-(p-isopropylphenyl) isomaleimide, N-(o-n-butylphenyl) isomaleimide, N-(m-n-butylphenyl) isomaleimide, N-(4-hydroxy-2-naphthyl) isomaleimide, N-(4-hydroxy-1-naphthyl) isomaleimide, and the like.

The term "divalent hydrocarbon radical" as used herein is intended to encompass both unsubstituted as well as substituted divalent hydrocarbon radicals. Illustrative of suitable radicals are alkylene radicals, such as ethylene, trimethylene, tetramethylene, pentamethylene, hexamethylene, 2-ethyl hexamethylene, octamethylene, nonamethylene, decamethylene, and the like; the cycloaliphatic radicals, such as 1,4-cyclohexane, 1,3-cyclohexane, 1,2-cyclohexane, and the like; halogenated alkylene and cycloaliphatic radicals, such as 2-chloroethylene, 2-bromoethylene, 2-fluoroethylene, 2-iodoethylene, 2-chlorotrimethylene, 2-bromotrimethylene, 2-chloropentamethylene, 3-chlorohexamethylene, 2-chlorooctamethylene, and the like; alkoxy and aryloxy substituted alkylene and cycloaliphatic radicals, such as methoxy methylene, ethoxy methylene, ethoxy ethylene, 2-ethoxy trimethylene, 3-ethoxy pentamethylene, 1,4-(2-methoxy cyclohexane), phenoxy ethylene, 2-phenoxy trimethylene, 1,3-(2-phenoxy cyclohexane), and the like; aralkylene radicals, such as phenyl ethylene, 2-phenyl trimethylene, 1-phenyl pentamethylene, 2-phenyl decamethylene, and the like; aromatic radicals, such as phenylene, naphthylene, and the like; halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like; alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene), and the like.

Among N-substituted isomaleimides wherein R in the formula previously noted is a divalent hydrocarbon radical having as a substituent on its terminal carbon atom a radical having the formula:

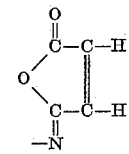

can be noted

N,N'-ethylene bis-isomaleimide,
N,N'-trimethylene bis-isomaleimide,
N,N'-tetramethylene bis-isomaleimide,
N,N'-decamethylene bis-isomaleimide,
N,N'-(1,4-cyclohexane) bis-isomaleimide,
N,N'-(2-chlorotrimethylene) bis-isomaleimide,
N,N'-(2-bromotrimethylene) bis-isomaleimide,
N,N'-(2-chlorotetramethylene) bis-isomaleimide,
N,N'-(3-chlorohexamethylene) bis-isomaleimide,
N,N'-(2-ethoxytetramethylene) bis-isomaleimide,
N,N'-(1-ethoxytetramethylene) bis-isomaleimide,
N,N'-[1,4-(2-methoxycyclohexane)] bis-isomaleimide,
N,N'-(2-phenoxyethylene) bis-isomaleimide,
N,N'-(2-phenoxytrimethylene) bis-isomaleimide,
N,N'-[1,4-(2-phenoxycyclohexane]) bis-isomaleimide,
N,N'-[1,4-(2-nitrocyclohexane)] bis-isomaleimide,
N,N'-phenyl ethylene bis-isomaleimide,
N,N'-(2-phenylethylene) bis-isomaleimide,
N,N'-(2-phenyltrimethylene) bis-isomaleimide,
N,N'-(2-phenyl tetramethylene) bis-isomaleimide,
N,N'-(1-phenyldodecamethylene) bis-isomaleimide,
N,N'-(1,4-phenylene) bis-isomaleimide,
N,N'-(1,5-naphthalene) bis-isomaleimide,
N,N'-[1,4-(2-chlorophenylene)] bis-isomaleimide,
N,N'-[1,4-(2-bromophenylene)] bis-isomaleimide,
N,N'-[1,4-(2-methoxyphenylene)] bis-isomaleimide,
N,N'-[1,4-(2-ethoxyphenylene)] bis-isomaleimide,
N,N'-[1,4-(2-phenoxyphenylene)] bis-isomaleimide,
N,N'-[1,4-(2-methylphenylene)] bis-isomaleimide,
N,N'-[1,4-(2-ethylphenylene)] bis-isomaleimide,
N,N'-(4,4'-diphenyl methane) bis-isomaleimide,
N,N'-(4,4'-diphenylether) bis-isomaleimide,
N,N'-[1,4-(2-n-dodecylphenylene)] bis-isomaleimide,
N,N'-(4,4'-benzophenone) bis-isomaleimide, and the like.

Particularly desirable compounds for purposes of this invention are those wherein R is either a monovalent or divalent radical as previously described having a maximum of 20 carbon atoms and being free of interfering groups, i.e., —COOH and NH$_2$.

N-substituted isomaleimides can be produced by reacting an N-substituted maleamic acid having the general formula:

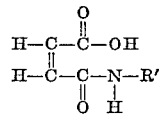

wherein R' is a hydrocarbon radical as defined for R, with a carbodiimide having the general formula:

$$R^2—N=C=N—R^3$$

wherein R$^2$ and R$^3$ are hydrocarbon radicals. The preparation of N-substituted isomaleimides is described in detail in our copending application Serial No. 851,029, filed November 5, 1959, now U.S. Patent 3,035,065, which is incorporated herein by reference.

Among suitable organic diamines having at least one hydrogen atom attached to each nitrogen atom are the organic primary and secondary diamines having the general formula:

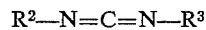

wherein R$^4$ and R$^6$ are hydrogen or monovalent hydrocarbon radicals and R$^5$ is a divalent hydrocarbon radical. R$^4$ and R$^6$ can be the same or different. Illustrative of suitable organic amines are 1,2-diaminoethane, 1,3-diaminopropane, 1,4-diaminobutane, 1,5-diaminopentane, 1,6-diaminohexane, 1,8-diaminooctane, 1,9-diaminononane, 1,10-diaminodecane, 1,4-diaminocyclohexane, 1,4-phenylene diamine, 1,3-phenylene diamine, 1,2-phenylene diamine, 4,4'-diaminodiphenyl methane, 4,4'-diaminodiphenyl, 3,3'-diamino-4,4'-dimethyldiphenyl, 3,3'-diamino-4,4'-dimethoxydiphenyl, N,N'-dimethylhexamethylene diamine, N,N'-dimethyl-(2-phenoxy)-trimethylene diamine, N,N'-dimethyldecamethylene diamine, N,N'-dimethyl-2-phenyl-decamethylene diamine, N,N'-dimethyl,3,3'-diamino-diphenyl, N-methyl-N'-ethyl-hexamethylene diamine, N-ethyl-N'-n-propyl-1,4-phenylene diamine, N-phenyl-N'-(3-chloropropyl)1,4-phenylene diamine, N-ethyl-N'-(2-phenyl-n-decyl) - butane - 1,4 - diamine, and like compounds free of interfering groups, i.e., COOH and OH. Particularly desirable organic diamines for purposes of this invention are those wherein R$^4$ and R$^6$ are hydrogen or monovalent hydrocarbon radicals containing a maximum of 20 carbon atoms and R$^5$ contains a maximum of 20 carbon atoms. Also suitable are heterocyclic diamines having the general formula:

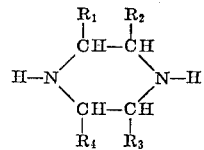

wherein R$_1$, R$_2$, R$_3$, and R$_4$ are monovalent hydrocarbon radicals or hydrogen. Suitable monovalent hydrocarbon radicals include, among others, the alkyl radicals, such as methyl, ethyl, n-propyl, n-butyl, isobutyl, and the like; cycloalkyl radicals such as cyclohexyl and the like; alkyl radicals having cycloalkyl substituents, such as cyclohexylmethyl and the like; aromatic hydrocarbon radicals, such as phenyl and the like. Specific suitable heterocyclics are 2-methyl-piperazine, 2,5-dimethyl-piperazine, 2-phenylpiperazine, and the like. Particularly desirable piperazines are those wherein R$_1$, R$_2$, R$_3$, and R$_4$ which can be the same or different are hydrogen or monovalent hydrocarbon radicals having a maximum of six carbon atoms and being free of interfering groups. Mixtures of diamines having the same reactivity can be used if desired.

Various amounts of the organic diamines and of the N-substituted isomaleimides can be reacted. Generally using from about 0.9 to about 1.1 moles of the organic diamine per mole of the N-substituted isomaleimide is satisfactory. Reacting a mixture containing more than about 1.1 moles of the organic diamine per mole of the N-substituted isomaleimide does not materially increase the yield of polymer produced and is economically undesirable. Optimum results are achieved using equimolar amounts of the two reactants.

The temperature at which the reaction between the N-substituted isomaleimide and the organic diamine is conducted can also vary over a wide range, from as low as about 20° C. to a temperature just below the decomposition point of the starting materials and of the polymer formed. At temperatures lower than about 20° C., the polymerization reaction proceeds sluggishly. A temperature in the range of about 100° C. to about 150° C. is most preferred.

It is also preferred to conduct the reaction between the organic diamine and the N-substituted isomaleimide in the presence of an organic diluent which is a solvent for the starting materials and is non-reactive with respect to the starting materials and the final product. The use of an organic diluent facilitates removal of the polymer from the reaction mixture. The actual organic diluent used will depend upon the starting materials and the temperature at which the polymerization reaction is to be conducted. The organic diluent should have a boiling point equal to or above the reaction temperature. It is customary to use the organic diluent in amounts of at least about 50% by weight based on the weight of the starting materials. The upper limit with respect to the amount of organic diluent used will depend upon the rate at which it is desired to conduct the polymerization reaction. The more dilute the reaction mixture, the slower the rate of reaction. From a practical standpoint, the organic diluent is used in amounts up to 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxybenzene and the like; aliphatic hydrocarbons, such as n-hexane, n-heptane, and the like; halogenated aliphatic hydrocarbons, such as dichloromethane and the like; ethers, such as diethyl ether, diethyl ether of ethylene glycol, diethyl ether of 1,3-propylene glycol, dioxane, and the like; aliphatic ketones, such as acetone, methyl ethyl ketone, and the like; also suitable are dimethyl formamide, petroleum ether, and the like.

The reaction between the N-substituted isomaleimide and the organic diamine is conducted, generally, under atmospheric pressure, although, if desired, the reaction can be conducted under subatmospheric or superatmospheric pressure.

The process of the present invention is conducted by simply admixing the N-substituted isomaleimide and the organic diamine at the desired temperature. The reaction between the N-substituted isomaleimide and the organic diamine to produce the thermoplastic, linear polymers of this invention is practically instantaneous in that some polymer is formed immediately upon admixing the reactants. It is customary, however, to allow the reaction mixture to stand for at least about one hour in order to insure that the polymerization reaction has proceeded to completion.

Recovery of the thermoplastic, linear polymer from the reaction mixture can be accomplished by any one of a number of convenient methods. For example, the polymer is usually recovered as a filter cake by filtering the reaction mixture. If the polymer is in solution, the solution can be poured into a liquid which is a nonsolvent for the polymer and a solvent for the liquid of the polymer solution with the result that the polymer will precipitate out. Recovery of the polymer can then be effected by simple filtration.

The thermoplastic, linear polymers of this invention can be extruded into various shaped articles, such as lamp bases, toys, and the like; cast into film material which can be used in the manufacture of bags, wrapping material, and the like; or formed into fibers which can be used in the manufacture of articles of clothing.

In the examples which follow which are illustrative and not intended to limit the scope of the invention in any manner, the procedure used to determine the reduced viscosity values was as follows. A 0.2 gram sample of the polymer was weighed into a volumetric flask containing 100 ml. of a solvent. The contents of the flask were stirred until solution of the polymer was complete. The solution was then filtered through a sintered glass funnel and the viscosity of a 3 ml. sample determined on a Cannon viscometer at about 25° C. Reduced viscosity was determined by the use of the equation:

$$RV = \frac{ts - to}{cto}$$

wherein:

*to* is the efflux time for the solvent
*ts* is the efflux time for the polymer solution
*c* is the concentration of the polymer solution in terms of grams of polymer per 100 ml. of solvent

EXAMPLE 1

*Polymer From N,N'-Hexamethylene Bis-Isomaleimide and Hexamethylene Diamine*

A mixture of 1.35 grams (0.005 mole) of hexamethylene bis-isomaleimide and 0.58 gram (0.005 mole) of hexamethylene diamine was dissolved in 200 ml. of dimethyl formamide and the resultant solution heated under reflux for three hours in a Pyrex glass flask. The precipitate that formed was filtered off.

1.4 grams of a tan colored, powdery polymer were recovered. The polymer had a reduced viscosity of 0.35 at 25° C. in a 3:2 by volume mixture of tetrachloroethane and phenol.

The polymer produced in the manner described was cast into film material by conventional casting techniques using a 20% by weight solution of polymer wherein the solvent was a 3:2 by volume mixture of tetrachloroethane and phenol.

EXAMPLE 2

*Polymer From N,N'-Hexamethylene Bis-Isomaleimide and Trimethylene Diamine*

A mixture of 1.35 grams (0.005 mole) of hexamethylene bis-isomaleimide and 0.35 gram (0.005 mole) of trimethylene diamine was dissolved in 20 ml. of dimethyl formamide and refluxed for 2½ hours. The precipitate that formed was filtered off. 1.5 grams of a tan color, powdery polymer were obtained.

EXAMPLE 3

*Polymer From N-n-Butyl Isomaleimide and Hexamethylene Diamine*

7.5 grams of a 50% by weight solution of hexamethylene diamine in dimethyl formamide were added, dropwise, and over a period of 10 minutes into a glass flask which contained a solution of 5.2 grams of N-n-butyl isomaleimide in 40 ml. of dimethyl formamide. The resultant solution was stirred and refluxed for one hour. The precipitate that formed was filtered off. Six grams of a white powder were obtained. The polymer was air dried at room tempertaure, about 25° C., for 12 hours, after which time the reduced viscosity of the polymer was determined to be 0.11 at 25° C. in a 3:2 by volume mixture of tetrachloroethane and phenol.

EXAMPLE 4

*Polymer From N-(o-Methylphenyl)-Isomaleimide and Hexamethylene Diamine*

A mixture of 1.88 grams of N-(o-methylphenyl)-isomaleimide and 1.16 grams of hexamethylene diamine was dissolved in 20 ml. of dimethyl formamide contained in a glass flask. The resultant mixture was heated at 100° C. for 20 hours. The tan colored precipitate that formed was filtered off, boiled with methanol, removed from the hot methanol by filtration, and allowed to stand for about 12 hours at about 25° C. Two grams of a tan colored solid polymer were obtained.

What is claimed is:

1. Process for the preparation of thermoplastic, linear polymers which comprises admixing an N-substituted isomaleimide having the general formula:

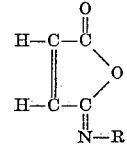

in which R is selected from the group consisting of monovalent hydrocarbon radicals and divalent hydrocarbon radicals having as a substituent on their terminal carbon atom a radical having the formula:

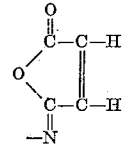

with at least about 0.9 mole, per mole of said N-substituted isomaleimide, of an organic diamine having at least one hydrogen atom attached to each nitrogen atom, said organic diamine being free of carboxyl and hydroxyl groups, for a period of time sufficient to produce a thermoplastic polymer.

2. Process for the preparation of thermoplastic, linear polymers which comprises admixing an N-substituted isomaleimide having the general formula:

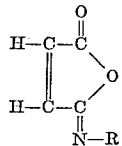

in which R is selected from the group consisting of monovalent hydrocarbon radicals and divalent hydrocarbon radicals having as a substituent on their terminal carbon atom a radical having the formula:

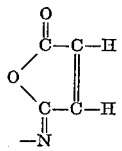

with from about 0.9 to about 1.1 moles per mole of said N-substituted isomaleimide of an organic diamine having at least one hydrogen atom attached to each nitrogen atom, said organic diamine being free of carboxyl and hydroxyl groups, for a period of time sufficient to produce a thermoplastic polymer.

3. Process as defined in claim 2 wherein the organic diamine is hexamethylene diamine.

4. Process as defined in claim 2 wherein the organic diamine is trimethylene diamine.

5. Process as defined in claim 2 wherein the N-substituted isomaleimide is N,N'-hexamethylene bis-isomaleimide.

6. Process as defined in claim 2 wherein the N-substituted isomaleimide is N-n-butyl isomaleimide.

7. Process as defined in claim 2 wherein the N-substituted isomaleimide is N-(o-methylphenyl)-isomaleimide.

8. Process as defined in claim 2 wherein the admixing is conducted at temperatures in the range of about 20° C. to a temperature below the decomposition temperature of the starting materials and the polymer which is formed.

9. Process as defined in claim 2 wherein the admixing is conducted at temperatures in the range of about 100° C. to about 150° C.

10. Process as defined in claim 2 wherein the organic diamine and N-substituted isomaleimide are present in equimolar amounts.

11. Process for the preparation of thermoplastic linear polymers which comprises admixing a reaction mixture containing an organic diluent, an N-substituted isomaleimide having the general formula:

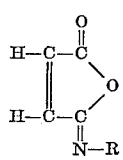

in which R is selected from the group consisting of monovalent hydrocarbon radicals and divalent hydrocarbon radicals having as a substituent on their terminal carbon atom a radical having the formula:

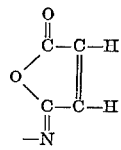

and from about 0.9 to about 1.1 moles per mole of said N-substituted isomaleimide of an organic diamine having at least one hydrogen atom attached to each nitrogen atom, said organic diamine being free of carboxyl and hydroxyl groups, at a temperature of from about 100° C. to about 150° C. for a period of time sufficient to produce a thermoplastic polymer.

12. A process for the preparation of thermoplastic, linear polymers which comprises admixing an N-substituted isomaleimide having the general formula:

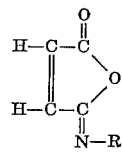

in which R is a monovalent hydrocarbon radical with at least about 0.9 mole per mole of said N-substituted isomaleimide of an organic diamine having at least one hydrogen atom attached to each nitrogen atom, said organic diamine being free of carboxyl and hydroxyl groups, for a period of time sufficient to produce a thermoplastic polymer.

13. A process for the preparation of thermoplastic, linear polymers which comprises admixing an N-substituted isomaleimide having the general formula:

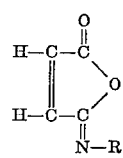

in which R is a divalent hydrocarbon radical having as a substituent on its terminal carbon atom a radical having the formula:

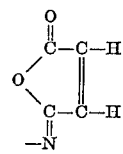

with at least about 0.9 mole per mole of said N-substituted isomaleimide of an organic diamine having at least one hydrogen atom attached to each nitrogen atom, said organic diamine being free of carboxyl and hydroxyl groups, for a period of time sufficient to produce a thermoplastic polymer.

14. A thermoplastic, linear polymer which is the reaction product of an N-substituted isomaleimide having the general formula:

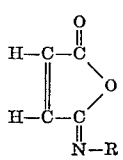

in which R is selected from the group consisting of monovalent hydrocarbon radicals and divalent hydrocarbon radicals having as a substituent on their terminal carbon atom a radical having the formula:

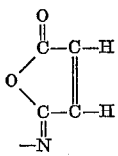

and an organic diamine having at least one hydrogen atom attached to each nitrogen atom, said organic diamine being free of carboxyl and hydroxyl groups.

15. A thermoplastic, linear polymer as defined in claim 14 wherein the N-substituted isomaleimide is N,N'-hexamethylene bis-isomaleimide.

16. A thermoplastic, linear polymer as defined in claim 14 wherein the N-substituted isomaleimide is N-n-butyl isomaleimide.

17. A thermoplastic, linear polymer as defined in claim 14 wherein the N-substituted isomaleimide is N-(o-methylphenyl)-isomaleimide.

18. A thermoplastic, linear polymer as defined in claim 14 wherein the organic diamine is hexamethylene diamine.

19. A thermoplastic, linear polymer as defined in claim 14 wherein the organic diamine is trimethylene diamine.

20. A thermoplastic, linear polymer which is the reaction product of an N-substituted isomaleimide having the general formula:

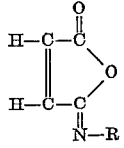

in which R is a divalent hydrocarbon radical having as a substituent on its terminal carbon atom a radical having the formula:

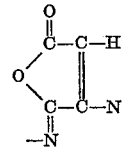

and an organic diamine having at least one hydrogen atom attached to each nitrogen atom, said organic diamine being free of carboxyl and hydroxyl groups.

21. A thermoplastic, linear polymer as defined in claim 20 wherein the said diamine has the formula:

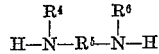

wherein $R^5$ is a divalent hydrocarbon radical and $R^4$ and $R^6$ are hydrogen.

22. A thermoplastic, linear polymer as defined in claim 20 wherein the said organic diamine has the formula:

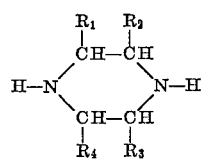

wherein $R_1$, $R_2$, $R_3$ and $R_4$ are hydrogen atoms.

23. A thermoplastic, linear polymer which is the reaction product of an N-substituted isomaleimide having the general formula:

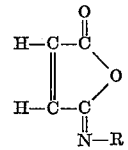

in which R is a monovalent hydrocarbon radical and an organic diamine having at least one hydrogen atom attached to each nitrogen atom, said organic diamine being free of carboxyl and hydroxyl groups.

24. A thermoplastic, linear polymer as defined in claim 23 wherein the said organic diamine has the general formula:

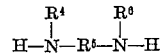

wherein $R^5$ is a divalent hydrocarbon radical and $R^4$ and $R^6$ are hydrogen.

25. A thermoplastic, linear polymer as defined in claim 23 wherein the said organic diamine has the general formula:

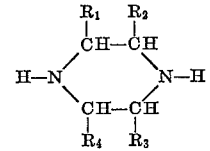

wherein $R_1$, $R_2$, $R_3$ and $R_4$ are hydrogen.

References Cited in the file of this patent

UNITED STATES PATENTS 2,301,356     Arnold et al. _____ Nov. 10, 1956

OTHER REFERENCES

Tsou et al.: Journal of Amer. Chem. Soc., volume 77, 1955, pages 4613–16.